(12) United States Patent
Yang et al.

(10) Patent No.: US 10,623,237 B2
(45) Date of Patent: Apr. 14, 2020

(54) METHOD OF MANAGING ZIGBEE NETWORK IN THE INTERNET OF THINGS

(71) Applicant: Alcatel Lucent, Boulogne-Billancourt (FR)

(72) Inventors: Shuigen Yang, Shanghai (CN); Gang Liu, Shanghai (CN); Fanxiang Bin, Shanghai (CN); Haibo Wen, Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 733 days.

(21) Appl. No.: 14/653,499

(22) PCT Filed: Jan. 13, 2014

(86) PCT No.: PCT/IB2014/000116
§ 371 (c)(1),
(2) Date: Jun. 18, 2015

(87) PCT Pub. No.: WO2014/118622
PCT Pub. Date: Aug. 7, 2014

(65) Prior Publication Data
US 2015/0312089 A1    Oct. 29, 2015

(30) Foreign Application Priority Data

Jan. 31, 2013 (CN) .......................... 2013 1 0039832

(51) Int. Cl.
*H04L 12/24* (2006.01)
*H04L 29/12* (2006.01)

(52) U.S. Cl.
CPC ...... *H04L 41/0654* (2013.01); *H04L 41/0886* (2013.01); *H04L 61/6081* (2013.01); *H04L 41/0213* (2013.01)

(58) Field of Classification Search
CPC .............. H04L 12/282; A47L 15/0047; A47L 15/0063; A47L 2501/26; G01D 4/002;
(Continued)

(56) References Cited

U.S. PATENT DOCUMENTS

| 9,172,738 B1* | 10/2015 | daCosta | ................. H04L 67/00 |
| 2012/0029717 A1* | 2/2012 | Cox | ......................... H02J 3/14 |
| | | | 700/295 |
| 2013/0294285 A1 | 11/2013 | Zhang et al. | |

FOREIGN PATENT DOCUMENTS

| CN | 102142980 A | 8/2011 |
| CN | 102201925 A | 9/2011 |

(Continued)

OTHER PUBLICATIONS

Zigbee Alliance: "ZigBee specification, document 053474r06, version 1.0", Internet Citation, Jun. 27, 2005 (Jun. 27, 2005), XP002474317, Retrieved from the Internet: <URL:http:f/www.nd.edu/-mhaenggijee67011/zi_gbee.pdf> [retrieved on Mar. 27, 2008), 2 pages.

(Continued)

*Primary Examiner* — Ayaz R Sheikh
*Assistant Examiner* — Debebe A Asefa
(74) *Attorney, Agent, or Firm* — Harness, Dickey & Pierce, P.L.C.

(57) ABSTRACT

The present invention provides a method of reporting network information of the ZigBee network in a ZigBee coordination node of an Internet of Things, wherein the ZigBee coordination node is connected to a plurality of ZigBee nodes forming the ZigBee network, and the Internet of Things further comprises an auto-configuration server in the IP network, the ZigBee coordination node being connected to the auto-configuration server through a gateway, the method comprising the following steps: sending a first signaling based on the ZigBee device object to the gateway, (Continued)

the first signaling including network description information and neighbor list information of each ZigBee node in the ZigBee network. According to the solution of the present invention, it makes it possible to use TR-069 to manage the ZigBee network, and in the case of ZigBee network failure, the manager of the ZigBee network can rapidly understand the failure cause so as to be capable of rapidly locating and eliminating the failure, thereby enhancing the network management efficiency.

15 Claims, 1 Drawing Sheet

(58) Field of Classification Search
CPC .............. G05B 19/00; G05B 2219/163; Y02B 70/325; Y04S 20/22
See application file for complete search history.

(56) References Cited

FOREIGN PATENT DOCUMENTS

| | | |
|---|---|---|
| CN | 102571888 A | 7/2012 |
| EP | 2 605 610 A1 | 6/2013 |
| WO | WO 2010098601 A2 * | 9/2010 ......... H04B 7/15557 |
| WO | WO-2011/150757 A1 | 12/2011 |

OTHER PUBLICATIONS

W. Lin, "Using OSGi UPnP and Zigbee to Provide a Wireless Ubiquitous Home Healthcare Environment", Mobile Ubiquitous Computing, Systems, Services and Technologies, 2008. UBICOMM '08. The Second International Conference on. IEEE, Piscataway, NJ, USA, Sep. 29, 2008 (Sep. 29, 2008), 6 pages.

"ZigBee device management system using web gateway",; SPIE, PO Box 10 Bellingham WA 98227-0010; USA,; Dec. 31, 2008 (Dec. 31, 2008), XP040430813,; the whole document.

Zigbee Alliance: "Zigbee Specification 2007—Chapter 3.6"; Internet Citation, Jan. 2008, 89 pages, Retrieved From the Internet: URL:http://www.zigbee.org [retrieved on Aug. 19, 2009].

International Search Report PCT/ISA/210 for International Application No. PCT/IB2014/000116 dated Jul. 7, 2014.

Zigbee Alliance: "ZigBee specification, document 053474r06, version 1.0", Internet Citation, Dec. 14, 2004, Retrieved from the Internet: <URL:http:f/www.nd.edu/-mhaenggijee67011/zi_gbee.pdf>, pp. 1-20.

* cited by examiner

METHOD OF MANAGING ZIGBEE NETWORK IN THE INTERNET OF THINGS

FIELD OF THE INVENTION

The present invention relates to the Internet of Things, and more specifically, relates to a method of managing a ZigBee network in the Internet of Things.

BACKGROUND OF THE INVENTION

The development of Internet of Things is gaining a rapid impetus. For example, sensor networks have been widely applied in healthcare, household automation, energy management, and environment observation, and the like. A common sensor network provides a low-cost and low-power-consumption duplex communication based on the ZigBee technology (using IEEE 802.15.4). The IEEE 802.15.4 defines the specifications for physical layer and media access control layer (MAC), and the ZigBee alliance defines the upper-layer specifications comprising the standards at the network layer and the application layer. Generally, in order to realize communication with the sensor network, a network controller called ZigBee coordination node is adopted to connect the ZigBee network to the Internet through a gateway (e.g., a broadband router).

In order to run the ZigBee network/Device in a stable way, it is needed to manage the ZigBee network/device. For example, performing remote management according to the TR-069.

The current ZigBee coordination node can use the ZigBee device object (ZDO) to acquire the information about a single ZigBee device state (for example, the IEEE address, network address, and work state and the like of the ZigBee device), translate the information about the single ZigBee device state into a format of TR-069, and sent the translated information to an auto-configuration server (ACS) in the IP network. The auto-configuration server, when managing the device in the ZigBee network, may use the received information about the single ZigBee device state. Therefore, it can be realized that the ZigBee device is managed by TR-069.

However, the operators, service providers or users not only need device information but also need network information (for example, link failure in the network) when managing the ZigBee network. According to the prior art, the auto-configuration server in the IP network cannot obtain the network information of the ZigBee network.

SUMMARY OF THE INVENTION

In view of the above, it would be very beneficial to propose a method for providing network information of a ZigBee network so as to facilitate management of the ZigBee network.

According to a first aspect of the present invention, there is provided a method of reporting network information of the ZigBee network in a ZigBee coordination node of an Internet of Things, wherein the ZigBee coordination node is connected to a plurality of ZigBee nodes forming the ZigBee network, and the Internet of Things further comprises an auto-configuration server in the IP network, the ZigBee coordination node being connected to the auto-configuration server through a gateway, the method comprising the following steps: sending a first signaling based on the ZigBee device object to the gateway, the first signaling including network description information and neighbor list information of each ZigBee node in the ZigBee network.

According to the solution of the present invention, there is provided a network object comprising core parameters at a ZigBee device object layer. In this way, a manager of the ZigBee network can know the information about the network, for example, network protocol, network topology, and the like, so as to facilitate the manager to manage the ZigBee network.

In an embodiment according to the present invention, the first signaling further comprises network failure cause information for the ZigBee network, the failure cause information being for describing the failure and situation occurring at the network layer.

Therefore, in the case of ZigBee network failure, the manager of the ZigBee network can rapidly understand the failure cause so as to be capable of rapidly locating and eliminating the failure, thereby enhancing the network management efficiency.

According to a second aspect of the present invention, there is provided a method for assisting in reporting network information of a ZigBee network in a gateway of an Internet of Things, wherein the Internet of Things further comprises an auto-configuration server in an IP network and a ZigBee coordination node in a non-IP network, the ZigBee coordination node being connected to a plurality of ZigBee nodes forming the ZigBee network and being connected to the auto-configuration server through the gateway, the method comprising the following steps: receiving a first signaling based on a ZigBee device object from the ZigBee coordination node, the first signaling containing network description information and neighbor list information for each ZigBee node in the ZigBee network; recording the information contained in the first signaling; translating the information contained in the first signaling into a TR-069-based message format, and sending the translated information to the auto-configuration server.

According to a third aspect of the present invention, there is provided a method of managing a ZigBee network in an auto-configuration server in an IP network of an Internet of Things, wherein the Internet of Things further comprises a ZigBee coordination node that is connected to a plurality of ZigBee nodes forming the ZigBee network, and the ZigBee coordination node being connected to the auto-configuration server through a gateway, the method comprising the following steps: receiving a TR-069-based first signaling from the gateway, the first signaling including network description information and neighbor list information of each ZigBee node in the ZigBee network.

According to the solution of the present invention, parameters of the ZigBee network can be provided to the auto-configuration server located in an IP network, such that it becomes possible to use TR-069 to manage the ZigBee network.

Various aspects of the present invention would become much clearer through the depiction of the preferred embodiments below.

BRIEF DESCRIPTION OF THE SEVERAL VIEWS OF THE DRAWINGS

Through reading the following detailed depiction on the non-limiting embodiments with reference to the accompanying drawings, the other features, objectives, and advantages of the present invention will become more apparent. In the drawings.

Throughout the drawings, the same or similar reference numerals represent the same or corresponding components or features.

DETAILED DESCRIPTION OF THE INVENTION

The following detailed description of the preferred embodiments will refer to the accompanying drawings that form a part of the present invention. The accompanying drawings exemplarily show some particular embodiments capable of implementing the present invention. The exemplary embodiments are not intended to exhaust all embodiments according to the present invention. It may be appreciated that without departing from the scope of the present invention, other embodiments may also be used, or structural or logical amendments may be performed to the present invention. Therefore, the following detailed description is not limitative, and the scope of the present invention is defined by the appending claims.

Figure 1:
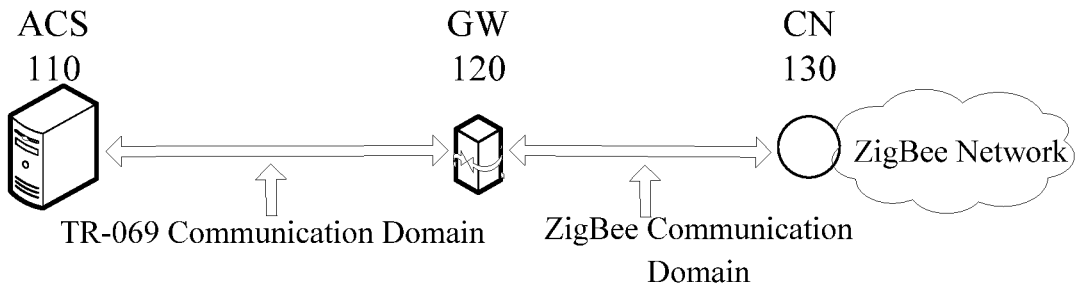
FIG. 1 shows a schematic diagram of a network architecture of an Internet of Things according to the present invention.

FIG. 1 shows a schematic diagram of a network architecture of an Internet of Things according to the present invention. As shown in the figure, the Internet of Things includes an auto-configuration server ACS 110, a gateway 120, and a ZigBee coordination node CN 130 in an IP network. The ZigBee network includes a plurality of ZigBee devices connected to the ZigBee coordination node CN 130. Hereinafter, the ZigBee devices connecting to the ZigBee coordination node CN 130 are called ZigBee nodes.

Those skilled in the art would appreciate that only devices necessary for understanding the present invention are illustrated here, and the Internet of Things may further comprise other devices, for example, another ZigBee network and its corresponding ZigBee coordination node, etc.

In the embodiment according to FIG. 1, the auto-configuration server ACS 110 is located in the IP network. The gateway GW 120 may translate a TR-069-based message into a ZigBee-device-object-based message and may also translate the ZigBee-device-object-based message into the TR-069-based message. The ZigBee coordination node CN 130 may route a data packet forwarded by the gateway GW 120 and originated from the auto-configuration server ACS 110 to a destination node in the ZigBee network and may also send the data packet originated from a ZigBee node in the ZigBee network to the gateway GW 120 and then send it to the auto-configuration server ACS 110.

Specifically, the communication between the auto-configuration server ACS 110 and the gateway GW 120 is based on the TR-069 protocol, and the communication between the gateway GW 120 and the ZigBee coordination node CN 130 is based on the ZigBee device object.

In one embodiment of the present invention, the ZigBee coordination node CN 130, on behalf of the ZigBee network, communicates with the auto-configuration server ACS 110 through the gateway GW 120.

Figure 2:
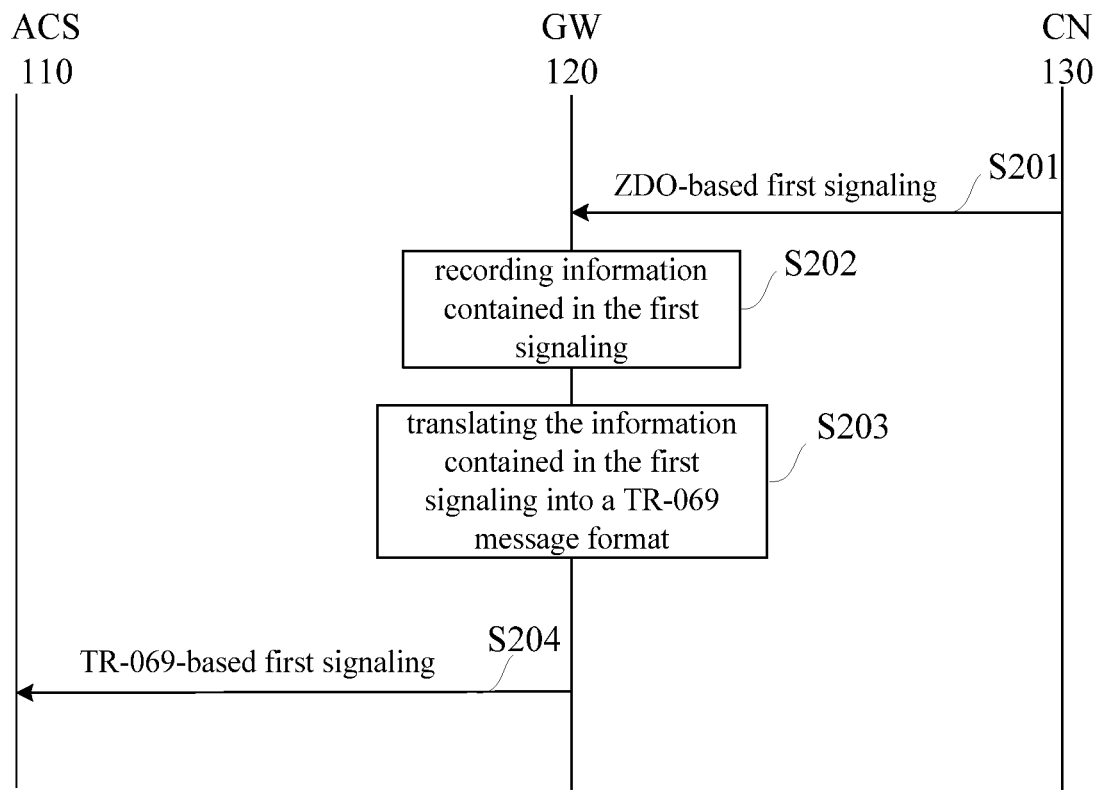
FIG. 2 shows a flow chart of a method according to an embodiment of the present invention.

FIG. 2 shows a flow chart of a method according to an embodiment of the present invention.

In step 201 of the method, a ZigBee coordination node CN 130 sends a ZigBee-device-object-based first signaling to a gateway GW 120, the first signaling containing network description information and neighbor list information for each ZigBee node in the ZigBee network where the ZigBee coordination node CN 130 is located.

Those skilled in the art would appreciate that in one embodiment according to the present invention, the first signaling may be voluntarily reported by the ZigBee coordination node CN 130 to the auto-configuration server ACS 110 through the gateway GW 120. In another embodiment of the present invention, the first signaling may also be reported by the ZigBee coordination node CN 130 to the auto-configuration server ACS 110 through the gateway GW 120 in response to a request from the auto-configuration server ACS 110.

Specifically, before the method step S201, there may further comprise: sending, by the auto-configuration server ACS 110, a TR-069-based first request message to the gateway GW 120, the first request message being for requesting the ZigBee coordination node CN 130 to report the first signaling. Afterwards, the gateway GW 120, after receiving the TR-069-based first request message from the auto-configuration server ACS 110, translates the first request message into a ZigBee-device-object-based format and sends the translated ZigBee-device-object-based first request message to the ZigBee coordination node CN 130.

Afterwards, in the method step S202, the gateway GW 120 records the information contained in the first signaling. In step S203 of the method, the information contained in the first signaling is translated into a TR-069-based message format, and in step S204 of the method, the translated TR-069-based first signaling is sent to the auto-configuration sever ACS 110.

In one embodiment of the present invention, the network description information in the first signaling contains information of a personal area network (PAN) where the current ZigBee node is located. Specifically, the network description information can include the following parameters:

TABLE 1

Parameters in Network Description Information

| Name | Type | Description |
|---|---|---|
| Extended PAN ID | String | 64-bit PAN Identifier of the Network |
| Logical Channel | String | Logical Channel Currently Occupied by the Network |
| Stack Profile | String | stack profile identifier used in the network |
| ZigBee Version | String | ZigBee protocol version used in the network |
| Beacon Order | String | IEEE802.15.4 beacon order of the device |
| Permit adding | Boolean | Indicate the device whether to accept the add request<br>True = the device accepts the add request<br>False = the device does not accept the add request |

In one embodiment according to the present invention, the neighbor list information contains information of routers that may be candidate parent nodes during the network discovery and joining phase, or the relationship and link-state information between the current ZigBee node and a neighboring ZigBee node after the current ZigBee node is added into the ZigBee network.

Those skilled in the art would appreciate that the candidate parent nodes should be located within the RD reception range of the current ZigBee node.

Specifically, in one embodiment according to the present invention, the neighbor list information can include the following parameters:

TABLE 2

Parameters in Neighbor List Information

| Name | Type | Description |
|---|---|---|
| Extended address | String | Unique 64-bit IEEE address of each device |
| Network address | String | 16-bit network address of the neighbor device |
| Device type | String | Type of the neighbor device: ZigBee coordinate node, router, or terminal device |
| Rx On When Idle | Boolean | Indicate the neighbor device whether the receiver is enabled during an idle period<br>True = receiver is on<br>False = receiver is off |
| Relationship | String | Relationship between the current device and the neighbor device;<br>The neighbor is a parent node;<br>The neighbor is a child node;<br>The neighbor is a brother node;<br>None of the above<br>The neighbor was a child node;<br>The neighbor is an unauthorized child node. |
| Transmission failure | String | Indicate whether the previous transmission to the device is successful or not |
| Outgoing overheads | String | Overheads of the outgoing link measured by the neighbor node. |
| Age | String | Number of link state cycles after receipt of the link state command |
| Incoming beacon timestamp | String | Time when receiving the last beacon frame of the neighbor node. The value is equal to the time-stamp of receipt of the beacon frame. |
| Beacon transmission time offset | String | The transmission time difference between the beacon of the neighbor node and the beacon of its parent node. Minus the difference from the corresponding input beacon timestamp to calculate the beacon transmission time of the parent node of the neighbor. |

In an embodiment according to the present invention, the first signaling further comprises network failure cause information for the ZigBee network, the failure cause information being for describing the failure and situation occurring at the network layer, so as to facilitate the ZigBee network manager to diagnose the problems appearing in the ZigBee network.

In one embodiment according to the present invention, the failure cause information contains destination address information where the failure occurs, and state code information indicating network failure.

Specifically, the failure cause information can include the following parameters:

TABLE 3

Parameters in Failure Cause Information

| Name | Type | Description |
|---|---|---|
| Destination Address | String | Destination address where the data frame fails |
| State Code | String | Detailed description of network error |

In one preferred embodiment according to the present invention, the state code may be:

No Route Available: no route to the intended destination address has been discovered;

Tree link failure: indicate that route failure caused by attempting to route the data frame along the tree;

No tree link failure: indicate that the route failure is not caused by attempting to route the data frame along the tree;

Low level: indicate that the insufficient power level of the relay device causes that the data frame is not forwarded;

No Route Capability: indicate a failure occurring because the relay device has no route capability;

No Directional Capability: indicate a failure caused by attempting to buffer data frame for a sleep child terminal device, while the relay device has no buffer capability;

No Directional Transaction Expiry: indicate that the data frame buffered for the sleep child terminal device is discarded due to time-out;

Target Device Unavailable: indicate that due to some reasons, the child terminal device of the relay device is unavailable;

Target address unallocated: indicate that the destination address of the data frame is a nonexistent child terminal device of relay device;

Parent link failure: indicate the failure caused by the RF link failure to the parent node of the device;

Validate route: indicate that the multicast route identified in the destination address field should be validated;

Source route failure: indicate occurrence of source route failure;

Multi-to-single route failure: indicate failure of a route built in response to a multi-to-single route request;

Address conflict: indicate that the address in the destination address filed is determined to be used for two or more devices;

Verified address: indicate that the IEEE address of the source device is in the source IEEE address field, and if the destination IEEE address field exists, then the value contained therein is the IEEE address of the desired destination;

PAN Identifier Updated: indicate that the network PAN identifier of the device has been updated;

Network address update: indicate that the network address of the device has been updated;

Bad Frame Counter: indicate that the value of the frame counter as reported in the received frame is less than or equal to the value stored in nwkSecurityMaterialSet.

Bad key serial number: indicate that the key serial number as reported in the received frame does not match nwkActiveKeySeqNumber.

The above provides a detailed description of network failures, such that in the case of ZigBee network failure, the manager of the ZigBee network can rapidly understand the failure cause so as to be capable of rapidly locating and eliminating the failure, thereby enhancing the network management efficiency.

It should be noted that the above embodiments are only illustrative, not for limiting the present invention. Any arbitrary technical solution that does not deviate from the spirit of the present invention should fall into the protection scope of the present invention. Besides, no reference numerals in the claims should be regarded as limiting the related claims; the word "comprise" does not exclude other means or steps not specified in other claims or description; and "a" before apparatus or means does not exclude existence of more such apparatuses or means.

What is claimed is:

1. A method of reporting network information of a ZigBee network in a ZigBee coordination node of an Internet of Things, wherein the ZigBee coordination node is connected to a plurality of ZigBee nodes forming the ZigBee network, and the Internet of Things includes an auto-configuration server in an IP network, the ZigBee coordination node being connected to the auto-configuration server via a gateway, the method comprising:

a. sending a first signaling based on a ZigBee device object to the gateway, the first signaling including network description information and neighbor list information of each ZigBee node in the ZigBee network, the first signaling further including network failure cause information for the ZigBee network, the network failure cause information describing a network failure and a situation occurring at a network layer.

2. The method according to claim 1, wherein
the network description information contains information of a personal area network where a current ZigBee node among the plurality of ZigBee nodes is located; and
the neighbor list information contains information of a router that may be a candidate parent node during a network discovery and joining phase, or a relationship and link-state information between the current ZigBee node and a neighboring ZigBee node after the current ZigBee node is added into the ZigBee network.

3. The method according to claim 1, wherein the failure cause information contains destination address information where the failure occurs and state coding information indicating the network failure.

4. The method according to claim 1, wherein the method further comprises before (a):
receiving a ZigBee-device-object-based first request message from the gateway, wherein the first request message is used for requesting the ZigBee coordination node to report the first signaling.

5. The method according to claim 1, wherein the failure cause information contains destination address information where the failure occurs and state coding information indicating the network failure.

6. The method according to claim 1, wherein
the network description information includes at least one of an extended PAN ID, logical channel information, stack profile identifier, ZigBee protocol version, and a beacon order, and
the neighbor list information includes at least one of an extended address of each Zigbee node, a network address for each Zigbee node, a device type of each Zigbee node, an indication if each ZigBee node is enabled, and a relationship between each ZigBee node and the coordination node.

7. A method for assisting in reporting network information of a ZigBee network in a gateway of an Internet of Things, wherein the Internet of Things further comprises an auto-configuration server in an IP network and a ZigBee coordination node in a non-IP network, the ZigBee coordination node being connected to a plurality of ZigBee nodes forming the ZigBee network and being connected to the auto-configuration server via the gateway, the method comprising:

I. receiving a first signaling based on a ZigBee device object from the ZigBee coordination node, wherein the first signaling contains network description information and neighbor list information for each ZigBee node in the ZigBee network, the first signaling further including network failure cause information for the ZigBee network, the network failure cause information describing a network failure and a situation occurring at a network layer;

II. recording the information contained in the first signaling; and

III. translating the information contained in the first signaling into a TR-069-based message format, and sending the translated information to the auto-configuration server.

8. The method according to claim 7, wherein
the network description information contains information of a personal area network where a current ZigBee node among the plurality of ZigBee nodes is located; and
the neighbor list information contains information of a router that may be a candidate parent node during a network discovery and joining phase, or a relationship and link-state information between the current ZigBee node and a neighboring ZigBee node after the current ZigBee node is added into the ZigBee network.

9. The method according to claim 7, further comprising before (I):
receiving a TR-069-based first request message from the auto-configuration server, wherein the first request message is used for requesting the ZigBee coordination node to report the first signaling; and
translating the first request message into a ZigBee-device-object-based format and forwarding it to the ZigBee coordination node.

10. The method according to claim 7, wherein
the network description information includes at least one of an extended PAN ID, logical channel information, stack profile identifier, ZigBee protocol version, and a beacon order, and
the neighbor list information includes at least one of an extended address of each Zigbee node, a network address for each Zigbee node, a device type of each Zigbee node, an indication if each ZigBee node is enabled, and a relationship between each ZigBee node and the coordination node.

11. A method of managing a ZigBee network in an auto-configuration server in an IP network of an Internet of Things, wherein the Internet of Things further comprises a ZigBee coordination node that is connected to a plurality of ZigBee nodes forming the ZigBee network, and the ZigBee coordination node being connected to the auto-configuration server via a gateway, the method comprising:

A. receiving a TR-069-based first signaling from the gateway, wherein the first signaling includes network description information and neighbor list information of each ZigBee node in the ZigBee network, the first signaling further including network failure cause information for the ZigBee network, the network failure cause information describing a network failure and a situation occurring at a network layer.

12. The method according to claim 11, wherein
the network description information contains information of a personal area network where a current ZigBee node among the plurality of ZigBee nodes is located; and
the neighbor list information contains information of a router that may be a candidate parent node during a network discovery and joining phase, or a relationship and link-state information between the current ZigBee node and a neighboring ZigBee node after the current ZigBee node is added into the ZigBee network.

13. The method according to claim 11, wherein the failure cause information contains destination address information where the failure occurs and state coding information indicating the network failure.

14. The method according to claim 11, wherein the method further comprises before (A):
sending a TR-069-based first request message to the gateway, wherein the first request message is used for requesting the ZigBee coordination node to report the first signaling.

15. The method according to claim 11, wherein
the network description information includes at least one of an extended PAN ID, logical channel information, stack profile identifier, ZigBee protocol version, and a beacon order, and
the neighbor list information includes at least one of an extended address of each Zigbee node, a network address for each Zigbee node, a device type of each Zigbee node, an indication if each ZigBee node is enabled, and a relationship between each ZigBee node and the coordination node.

* * * * *